United States Patent
Schad

[19]

[11] Patent Number: 6,093,361
[45] Date of Patent: Jul. 25, 2000

[54] CLAMP SYSTEM AND METHOD

[75] Inventor: Robert D. Schad, Toronto, Canada

[73] Assignee: Husky Injection Molding Systems Ltd., Canada

[21] Appl. No.: 09/127,669

[22] Filed: Jul. 31, 1998

[51] Int. Cl.[7] .................................................. B29C 45/64
[52] U.S. Cl. ...................... 264/328.1; 425/589; 425/595; 425/451.7; 425/451.9
[58] Field of Search .................................... 425/589, 595, 425/450.1, 451.7, 451.9; 264/328.1, 334

[56] References Cited

U.S. PATENT DOCUMENTS

| | | | |
|---|---|---|---|
| 3,191,235 | 6/1965 | Rougement | 425/451.7 |
| 3,704,973 | 12/1972 | Renfrew et al. | 425/451.7 |
| 4,645,443 | 2/1987 | Aoki | 425/150 |
| 4,832,884 | 5/1989 | Speck et al. | 264/40.5 |
| 4,966,738 | 10/1990 | Inaba et al. | 264/40.5 |
| 5,133,655 | 7/1992 | Schad et al. | 425/150 |
| 5,147,661 | 9/1992 | Kurumaji et al. | 425/150 |
| 5,261,810 | 11/1993 | Kamp et al. | 425/451.9 |
| 5,338,171 | 8/1994 | Hayakawa et al. | 425/138 |
| 5,370,518 | 12/1994 | Sasaki et al. | 425/147 |
| 5,620,723 | 4/1997 | Glaesener et al. | 425/589 |
| 5,645,875 | 7/1997 | Glaesener et al. | 425/589 |

FOREIGN PATENT DOCUMENTS

| | | |
|---|---|---|
| 3006609 | 8/1981 | Germany . |
| 4-332616 | 11/1992 | Japan . |
| 9-29802 | 2/1997 | Japan . |

*Primary Examiner*—James P. Mackey
*Attorney, Agent, or Firm*—Bachman & LaPointe, P.C.

[57] ABSTRACT

Stationary and movable platens are provided having mold halves affixed thereto. The movable platen is reciprocatingly moved between a mold open and a mold closed position, and a clamping force is applied to the movable platen in the mold closed position, and a mold break force is applied to the movable platen in the mold closed position. At least one column is provided having a first end affixed to the movable platen, and a threaded rod engages a threaded member which is operatively connected to the column.

20 Claims, 2 Drawing Sheets

CLAMP SYSTEM AND METHOD

BACKGROUND OF THE INVENTION

The present invention relates to a clamp for an injection molding machine which uses an electric screw drive for clamp stroke motions and at least one column engaging a hydraulic clamp piston to provide clamp force. The present invention also includes a self adjusting mechanism connected to the column so that dimensional changes caused by clamp deflections do not damage the drive means.

The prior art includes many injection molding machines which use tiebar clamping units for positioning a platen for the application of clamp-up forces. Control systems using hydraulic fluid, pressurized air and electric motors in combination with numerous switches and typically a controller unit are used to control both the positioning of the platens and the application and removal of clamp-up force for acquiring mold clamp-up and mold break.

Japanese Patent 61261-017 discloses a clamping mechanism for injection molding machines. The purpose of the control system therein is to maintain a parallel parting line between the molds by sensing the distance traveled by each clamping cylinder of each tiebar and maintaining the distances substantially equal. Accordingly, parallelism of the parting line between the molds can be maintained when the injection pressure of molten resin is uneven within the mold.

U.S. Pat. No. 4,832,884 to Speck et al. discloses a method for measuring and controlling the closing force of a plastic injection molding machine. Accordingly, for an injection molding machine, a closing force is measured for a predetermined number of operation cycles. A mean value is calculated from the measurements and if the mean value is within a predetermined tolerance, no control intervention takes place. However, if the mean value is outside the tolerance but within a zone limited by alarm units, control intervention takes place by stepwise changing the installed height of the mold until the actual value measured for closing force after each operating cycle is within the tolerance given. In this method and system, a toggle joint system serves to generate the closing force on the first and second mold parts. In this case, the force is measured and if the force is within a tolerance zone, the spacing between the first and second mold parts is altered to less than or no increase relative the old force.

U.S. Pat. No. 4,966,738 to Inaba et al. discloses a method for mold clamping force adjustment. Accordingly, in this method, a mold touch position is detected, at which the mold halves of a mold contact each other. The mold temperature is detected by means of thermocouple attached to the mold halves. The mold thickness is obtained based on the position where a movable platen and a stationary platen of the injection molding machine contact each other. After a molding operation is started, the mold temperature is detected and the amount of change in mold thickness during a period between a preceding cycle and a current cycle is calculated based on the change of mold temperature, the mold thickness, and the thermal expansion coefficient of the mold. A mold touch position for a current cycle is obtained based on the calculated value. Accordingly, when the mold is clamped in the current cycle, the movable platen is moved from the mold touch position toward the stationary platen by a predetermined amount to produce a predetermined mold clamping force. For this method, the measurements and adjustments are directed primarily to the mold position and not to the position of the clamping units. A clamping unit is a singular one which functions to force the movable platen against the stationary platen. That is, no tiebar clamping units are used internal to any of the platens for producing the clamp-up force.

U.S. Pat. No. 5,147,661 to Kurumaji et al. discloses a mold aligning device for a compression molding machine. The mold aligning device includes a plurality of mold position adjusting cylinder actuators disposed on a bed wherein position detectors are associated with the mold positioning adjusting cylinder actuators to detect the strokes thereof. The hydraulic source for driving the mold position adjusting cylinder actuators and control unit for controlling the strokes of the piston rods of the actuators with reference to zero points of the piston rods of the actuators, is determined beforehand. The zero points are decided by placing the upper mold in close contact with the lower mold and extending the piston rods of the actuators so that the piston rods are pressed against the lower surface of a slide block. The strokes of the piston rods are controlled during a compression-molding operation so that the upper mold is maintained precisely in parallel with the lower mold. This device is directed to pressure molding. The cylinder actuators are not positioned within a movable molten platen, and the actuators do not clamp onto tiebars. The main purpose of the machine is to maintain parallelism between the upper and lower molds by the actuators placing direct pressure on the upper mold supporting surface for maintaining the same parallel to the lower mold.

U.S. Pat. No. 5,338,171 to Hayakawa et al. discloses a die-clamping apparatus with an aligning device. The apparatus includes a stationary die plate for holding a stationary die, a movable die plate for holding a movable die, a hydraulic cylinder for moving the movable die plate forwardly and rearwardly with respect to the stationary die plate, and a tiebar for clamping by a fastening device located in the movable die plate. One or more alignment devices are provided so as to join the movable die and the stationary die in such a manner that primary alignment can be performed. The molding apparatus can be provided with a guide pin for secondarily aligning the movable die with respect to the stationary die when the stationary die and the movable die have been placed at predetermined positions. Four die clamping cylinders are provided at the corners of the stationary die plate so as to apply a clamping force to the stationary and movable dies after the fastening device has fastened to the tiebar. For this device, the tiebar fastener and clamping units, while being located on the tiebars, one adjacent the movable platen and one adjacent the stationary platen, are separate devices adding to the complexity of the machine.

U.S. Pat. No. 5,370,518 to Sasaki et al. discloses an apparatus for injection and compression molding. The apparatus includes an injection device and a compression molding device wherein the compression molding device includes a stationary die plate for holding a stationary die, a movable die plate for holding a movable die, means for rapidly extending and retracting the movable die plate relative to the stationary die plate and means for locking the movable die plate to the tiebars at a position where the movable die plate approaches the stationary die plate. Means for fastening the dies after the movable die plate is locked to the tiebars is also provided. An injection device for feeding a molten plastic material into a mold cavity between the stationary die and the movable die initiates feeding of the molten plastic material into the mold cavity when the stationary die and movable die are parted from each other by a predetermined distance. The plastic material is compressed and drawn while the movable die is moved towards the stationary die after a predetermined quantity of molten plastic material has been fed into the mold cavity. The apparatus includes a device in a movable die plate for clamping onto the tiebars. However, the device does not include a combined means for providing the clamping force between the platens and fastening to the tiebars, as the clamp force is provided by separate die fastening cylinders which are positioned on the tiebars but separate from the fasteners.

U.S. Pat. No. 5,133,655 to Schad et al. shows a clamp mechanism for an injection molding machine in which four columns attached to the moving platen are individually gripped by fluid actuated cylinders which also act as clamp force pistons. While this design is effective, it requires very close tolerances to be maintained between the columns and the inner bores of the cylinders since the amount of deflection of the cylinder walls to achieve sufficient gripping on the columns is small. Thus, manufacturing this clamp is expensive and in operation maintaining these small clearances imposes costly maintenance procedures.

U.S. Pat. Nos. 5,620,723, 5,624,695 and 5,645,875 to Glaesener show a novel lock nut arrangement for engaging the tiebars of a two platen injection molding machine clamp, for example. The locking nuts also act as clamp force pistons acting on the tiebars to clamp the mold between the platens.

The combination of a screw driven clamp stroke and hydraulic clamping are shown in U.S. Pat. No. 3,191,235 to Rougement, Japanese Patent 2-252518, and European Patent Publication 0 508 277 to Miese et al. In the '235 and '277 references, a single clamp piston is carried inside a cylinder in the moving platen. The rod of the clamp piston is directly connected to a single column which is threaded along most of its length such that a nut can engage the thread and either the column or nut are rotated to cause the column, clamp piston and moving platen to move. Once the screw drive has closed the mold, high pressure hydraulic oil is supplied to the non-rod side of the clamp piston to cause the moving platen to exert a clamping pressure against the mold.

The '518 reference teaches a similar threaded column for mold closing in combination with a variety of means for exerting clamp force against the mold. FIGS. 1–3 in the '518 reference illustrate the invention, which is a column blocking method. Center column 46 is attached to the moving platen 5, which in turn is moved by nuts 32 engaging threaded columns 31 to cause stroke motion. When the moving platen has moved to the mold closed position (see FIGS. 1 and 2), shutter 49 is moved by cylinder 50 between the end of the column 46 and sleeve 39 blocking column movement. Sleeve 39 is threaded into shutheight adjustment nut 38 carried in the clamp block 30. By rotating the nut 38, the end of the sleeve 39 that engages the shutter can be moved with respect to the block 30, thereby adjusting the distance between the closed platens 5 and 3 to provide for molds having different shutheights. Clamping force is generated by hydraulic cylinders 35 acting on the ends of tiebars 4 and mounted in the clamp block 35.

U.S. Pat. No. 4,645,443 to Aoki shows a hydraulic clamp having both stroke and clamp functions performed by hydraulic cylinders acting through a single column. The shutheight adjustment is made using a threaded connection between the column end and the moving platen. Thus, clamping forces are transmitted via the column through the threaded connection to the moving platen.

PCT Publication US97/19507, published May 14, 1998, shows a means for applying a clamping force to a movable platen. At least one column is affixed to the movable platen. A plurality of circumferentially spaced teeth is provided on the end of the column spaced from the movable platen, and a clamp piston and lock means engaging the clamp piston are provided operative to engage and disengage the teeth.

It is highly desirable to provide a means for accommodating the variations in column length that can occur due to the forces generated by the clamping piston acting on the column. This is particularly important when the column transmits the clamping and the opposed mold break forces to the moving platen, as described in the above PCT publication.

Accordingly, it is an object of the present invention to provide a fast acting and energy efficient injection molding machine clamp assembly and clamping method.

It is a still further object of the present invention to provide an improved injection molding machine clamp assembly and method as aforesaid with low construction cost, low maintenance and good reliability.

It is a still further object of the present invention to provide an improved injection molding machine clamp assembly and method which occupies less floor space than conventional designs.

It is an additional object of the present invention to provide an improved injection molding machine clamp assembly and method which accommodates variations in column length that can occur due to the forces generated by the clamping piston acting on the piston.

Further objects and advantages of the present invention will appear hereinbelow.

SUMMARY OF THE INVENTION

In accordance with the present invention, it has now been found that the foregoing objects and advantages are readily obtained.

The securing/clamping system of the present invention comprises: a stationary platen having a first mold half affixed thereto; a movable platen having a second mold half affixed thereto; means for reciprocatively moving said movable platen between a mold open and a mold closed position; means for applying a clamping force to said movable platen in the mold closed position, and means for applying a mold break force to said movable platen in the mold closed position; and wherein said means for reciprocatively moving comprises at least one column having a first end affixed to the movable platen and a second end spaced from the movable platen, and said means for reciprocatively moving also including a threaded rod operatively engaging a threaded member, said threaded member operatively connected to said at least one column, and wherein said threaded member engages said column and rod in a manner to accommodate variations in the positions of said column and rod without inducing stress. Desirably, the movable platen travels along a plurality of tiebars. Also, the column preferably includes an internal channel, with the threaded rod and threaded member located at least in part in the internal channel. In preferred embodiments, the threaded member is splined within the column and/or floats axially with respect to the rod and column.

The present invention also provides a securing/clamping method, which comprises: providing a stationary platen having a first mold half affixed thereto, and a movable platen having a second mold half affixed thereto; reciprocatingly moving said movable platen between a mold open and a mold closed position; applying a clamping force to said movable platen in the mold closed position, and applying a mold break force to said movable platen in the mold closed position; and wherein said reciprocatively moving step includes affixing a first end of at least one column to the movable platen and spacing a second end of said at least one column from the movable platen, operatively engaging a threaded member and said at least one column, operatively engaging a threaded rod with said threaded member, and engaging said threaded member with said column and rod in a manner to accommodate variations in the positions of the column and rod without inducing stress.

Further features of the present invention and advantages thereof will appear from the following specification.

BRIEF DESCRIPTION OF THE DRAWINGS

The present invention will be more readily understood from a consideration of the following illustrative drawings, wherein.

DETAILED DESCRIPTION OF PREFERRED EMBODIMENTS

The present invention utilizes a clamping unit including at least one column having circumferentially spaced teeth and at least one axial groove circumferentially spaced between the teeth. Rotation of the column is operative to engage and disengage the teeth with corresponding teeth on a clamp piston. This type of clamping unit is shown in the aforementioned PCT '507 publication.

Figure 1:
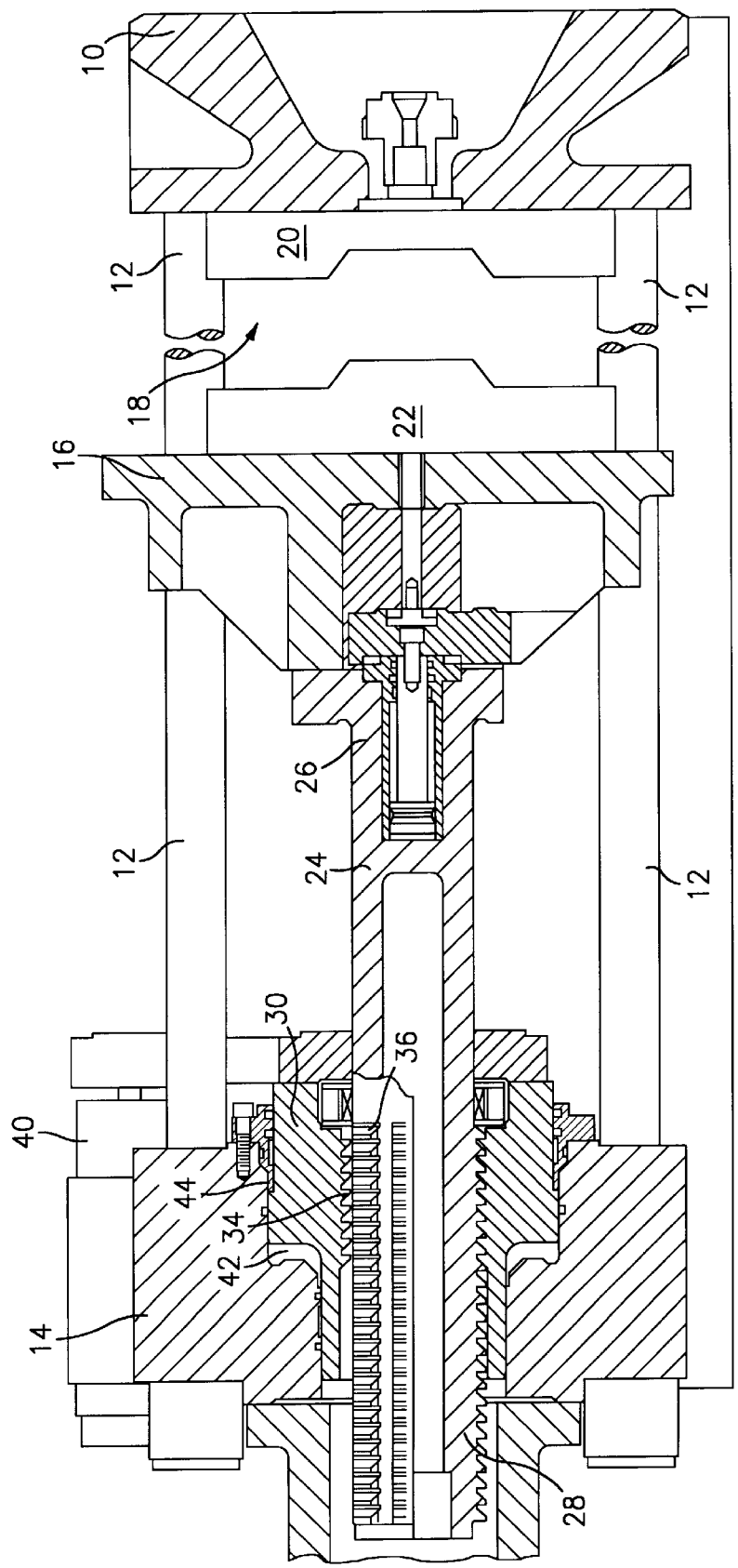
FIG. 1 is a partial section view of a clamp mechanism of the present invention.

Referring to FIG. 1, stationary platen 10 is connected by tiebars 12 to clamp block 14. Moving platen 16 slides on the base or on the tiebars to open or close mold 18 (shown in the mold open position in FIG. 1). Mold 18 includes a first mold half 20 affixed to stationary platen 10 and a second mold half 22 affixed to movable mold half 16. Only one mold is shown in FIG. 1 for simplicity, but naturally a plurality of the molds can readily be provided. Tiebars 12 connect the stationary platen 10 and clamp block 14 while supporting the movable platen 16 which is free to slide along the tiebars. Generally four or more of the tiebars are used with only two being shown in FIG. 1. Moving platen 16 is moved from a mold open position as shown in FIG. 1 to a mold closed position by means which will be described hereinbelow.

Column 24 is fixed to the back side of movable platen 16, i.e., the movable platen side opposed to mold 18. At least one of said columns are provided and two or more of same may readily be used. Column 24 has a first end 26 affixed to the movable platen and a second end 28 spaced from the movable platen. Second end 28 of column 24 passes through annular clamp piston 30 which in turn is housed in clamp cylinder 42 in clamp block 14. Clamp piston 30 has teeth 34 that engage corresponding teeth 36 on column 24. Rotation of clamp piston 30 may be accomplished by any desired means, as by cylinder 38 (FIG. 2), or by servo drive means 40 (FIG. 1). Rotation of the clamp piston serves to engage or disengage clamp piston teeth 34 from column teeth 36. Alternatively or in addition, one may provide at least one axial groove circumferentially spaced between column teeth 36 and rotate the column to engage and disengage the clamp piston teeth and column teeth.

Figure 2:
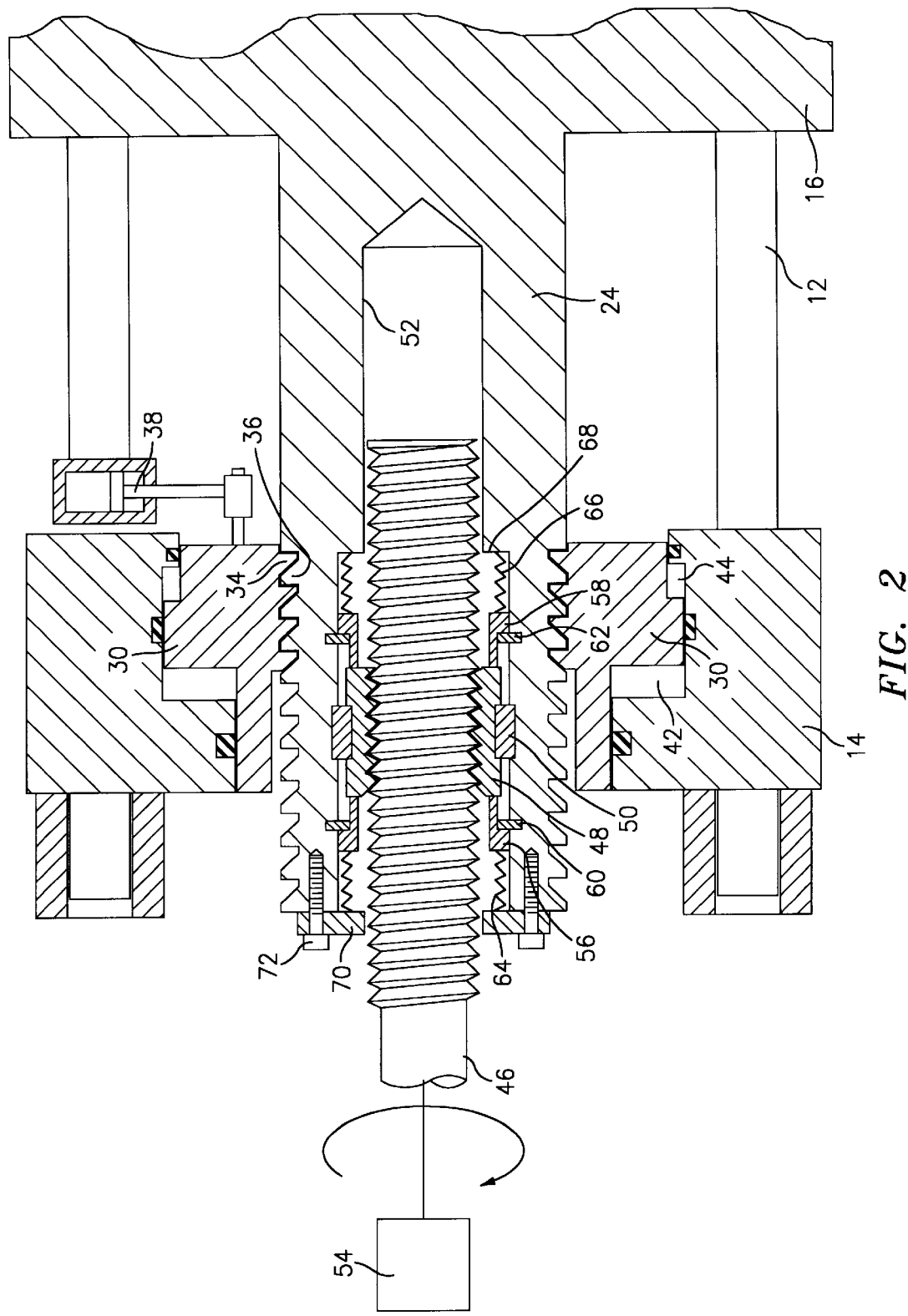
FIG. 2 is a detailed section view of the clamp mechanism.

When the teeth are engaged, as shown in FIG. 2, hydraulic oil pressure in cylinder 42 acting on clamp piston 30 causes column 24 to transmit a closing or clamping force against moving platen 16 and hence against mold 18. When hydraulic pressure is supplied to cylinder 44 and acts on the opposed "mold break" side of piston 30, an opening force is transmitted via column 24 to moving platen 16 and hence to mold 18. These opposed forces act through the engaged teeth 34, 36 of the clamp piston 30 and column 24, respectively.

When cylinder 38 or servo drive 40 are activated, they cause piston 30 to rotate and disengage clamp piston teeth 34 from the corresponding column teeth 36. Thus disengaged, column 24 and moving platen 16 are free to move with respect to clamp piston 30 and clamp block 14. This motion is caused by rotating threaded rod 46 and engaging threaded member or nut 48, which is splined by spline means 50 inside internal channel 52 of column 24. Rotation of rod 46 can be by any desired means, as by direct servo motor 54 or via a gearbox or belt, or any other rotary drive means. Thus, as rod 46 is rotated, column 24 and movable platen 16 are moved. Reversing the rotation of the drive means 54 causes column 24 and movable platen 16 to move in the opposite direction. Thus, the mold 18 can be opened or closed using this drive means.

However, a drive means acting on a column through which clamp forces are generated causes problems. Thus, absent any means for adjusting the relative linear position between rod 46 and column 24 during actuation of clamp piston 30 in either direction (clamping or mold breaking), a binding force is created at the threaded engagement of rod 46 and threaded member 48 which over time can cause severe wear and even seizing. The present invention solves this problem.

Thus, in accordance with the present invention, threaded member 48 is splined by connection with spline means 50 and allowed to float axially with respect to rod 46 and column 24 such that variations in their respective positions can be accommodated without inducing stress. Threaded member 48 is provided with means to limit the stroke thereof. Thus, the threaded member is trapped between two collars 56, 58 which are themselves located by respective lock rings 60, 62 to limit their stroke. The end faces of collars 56, 58 are acted on by springs, respectively 64, 66, to centralize the position of the threaded member 48 between lock rings 60, 62. The springs act against stop means. Thus, spring 66 acts against end wall 68, and spring 64 acts against stop plate 70 which in turn is fastened to the end of column 24 by screws 72.

The strength of springs 64, 66 are selected to provide forces larger than the mold opening or closing forces so as to limit the relative movement between the threaded member 48 and column 24, during these motions. Other clamp ratings would have correspondingly different spring ratings.

The springs 64, 66 allow column 24 to move with respect to rod 46 while maintaining a force on both ends of the threaded member 48 to insure that its position remains centralized within the stroke permitted by lock rings 60, 62. Thus, the force exerted by the threaded member to cause the moving platen to move passes through the springs.

Another option for smaller sized units is to rely on the screw drive of the stroke motion to provide the mold break force prior to clamp opening. In this configuration, the spring 64 can be eliminated and collar 56 can act directly against stop plate 70 during mold break and clamp opening operations.

Thus, in operation, in the mold open position, motor 54 turns screw drive or threaded rod 46 that engages threaded member or nut 48 to cause platens 10 and 16 to close. Next cylinder 38 rotates clamp piston 30 so that clamp piston teeth 34 engage column teeth 36. Oil acts in cylinder 42 to clamp mold 18. After cooling, the mold break cylinder 44 is activated to cause the mold 18 to open slightly. The teeth 34, 36 are still engaged at this point. Then cylinder 38 causes piston 30 to rotate to disengage teeth 34, 36. The screw drive or rod 46 then rotates in the opposite direction to open mold 18.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A securing/clamping system for use with platens of a molding machine, which comprises:
    a stationary platen having a first mold half affixed thereto;
    a movable platen having a second mold half affixed thereto;
    means for reciprocatingly moving said movable platen with respect to the stationary platen between a mold open and a mold closed position;
    means for applying a clamping force to said movable platen in the mold closed position, and means for applying a mold break force to said movable platen in the mold closed position; and
    wherein said means for reciprocatingly moving comprises at least one column having a first end affixed to the movable platen and a second end spaced from the movable platen, and said means for reciprocatingly moving also including a threaded rod operatively engaging a threaded member, said threaded member operatively engaging said at least one column, and wherein said threaded member engages said column and rod in a manner to accommodate variations in the positions of said column and rod without inducing stress.

2. System according to claim 1, wherein said movable platen travels along a plurality of tiebars.

3. System according to claim 1, wherein said column includes an internal channel, with said threaded rod and threaded member located at least in part in said internal channel.

4. System according to claim 1, wherein said threaded member is splined within said column.

5. System according to claim 1, wherein said threaded member floats axially with respect to the rod and column.

6. System according to claim 1, including a clamp piston with spaced teeth which engage corresponding teeth on said column.

7. System according to claim 3, wherein rotation of the threaded rod reciprocatively moves said movable platen.

8. System according to claim 1, wherein the threaded member has a stroke and including means to limit the stroke of the threaded member.

9. System according to claim 8, including means to centralize the position of the threaded member.

10. System according to claim 9, including collars affixed to said threaded member on opposed sides thereof, and at least one spring connected to at least one of said collars which act against stop means.

11. System according to claim 10, wherein said at least one spring provides forces larger than mold closing or mold opening forces.

12. A securing/clamping method for use with platens of a molding machine, which comprises:
    providing a stationary platen having a first mold half affixed thereto, and a movable platen having a second mold half affixed thereto;
    reciprocatingly moving said movable platen with respect to the stationary platen between a mold open and a mold closed position;
    applying a clamping force to said movable platen in the mold closed position, and applying a mold break force to said movable platen in the mold closed position; and
    wherein said reciprocatingly moving step includes affixing a first end of at least one column to the movable platen and spacing a second end of said at least one column from the movable platen, operatively engaging a threaded member and said at least one column, and operatively engaging a threaded rod with said threaded member, and engaging said threaded member with said column and rod in a manner to accommodate variations in the positions of the column and rod without inducing stress.

13. Method according to claim 12, including moving said movable platen along a plurality of tiebars.

14. Method according to claim 12, including locating said threaded rod and threaded member at least in part in an internal channel in said at least one column.

15. Method according to claim 12, including splining said threaded member within said column.

16. Method according to claim 12, including positioning said threaded member so that said threaded member floats axially with respect to the rod and column.

17. Method according to claim 12, including the step of engaging clamp piston teeth with corresponding teeth on said column.

18. Method according to claim 16, including the step of rotating said threaded rod to reciprocatingly move said movable platen.

19. Method according to claim 12, including limiting the stroke of the threaded member.

20. Method according to claim 19, including centralizing the position of the threaded member.

* * * * *